(12) United States Patent
Pacholyk et al.

(10) Patent No.: US 8,550,540 B1
(45) Date of Patent: Oct. 8, 2013

(54) AERODYNAMIC DEVICE FOR TRAILERS AND THE LIKE

(76) Inventors: Thomas W. Pacholyk, Weedsport, NY (US); Jill M. Pacholyk, Weedsport, NY (US)

( * ) Notice: Subject to any disclaimer, the term of this patent is extended or adjusted under 35 U.S.C. 154(b) by 0 days.

(21) Appl. No.: 13/604,582

(22) Filed: Sep. 5, 2012

(51) Int. Cl.
*B62D 35/00* (2006.01)

(52) U.S. Cl.
USPC ..................... 296/180.4; 296/180.1

(58) Field of Classification Search
USPC .......................... 296/180.4, 180.1
See application file for complete search history.

(56) References Cited

U.S. PATENT DOCUMENTS

| | | | |
|---|---|---|---|
| 4,015,876 A | 4/1977 | Hulverson et al. | |
| 4,088,362 A | 5/1978 | Mollura | |
| 5,190,342 A | 3/1993 | Marlowe et al. | |
| 5,280,990 A | 1/1994 | Rinard | |
| 5,332,280 A * | 7/1994 | DuPont et al. | 296/180.1 |
| 5,641,192 A | 6/1997 | Smith et al. | |
| 7,104,591 B1 | 9/2006 | Sanns | |
| 7,992,666 B2 | 8/2011 | Otterstrom | |
| 2009/0256386 A1 | 10/2009 | Wood | |

* cited by examiner

*Primary Examiner* — Joseph Pape
*Assistant Examiner* — Dana Ivey
(74) *Attorney, Agent, or Firm* — Richard L Miller

(57) ABSTRACT

A device for attaching to and covering an entire blunt nose of a blunt-nosed trailer that is attached to and spaced behind a towing vehicle without impinging upon the towing vehicle so as to reduce drag of the blunt-nosed trailer when being towed by the towing vehicle by changing the blunt nose of the blunt-nosed trailer to a lateral wedge. The device includes a frame and a skin. The frame is laterally wedge-shaped, is rigid, and is for attaching to the blunt nose of the blunt-nosed trailer without impinging upon the towing vehicle. The skin covets the frame, is rigid, is laterally wedge-shaped, encloses the frame, and is for covering the entire blunt nose of the blunt-nosed trailer so as to reduce drag of the blunt-nosed trailer when being towed by the towing vehicle by changing the blunt nose of the blunt-nosed trailer to a lateral wedge.

23 Claims, 3 Drawing Sheets

AERODYNAMIC DEVICE FOR TRAILERS AND THE LIKE

1. BACKGROUND OF THE INVENTION

A. Field of the Invention

The embodiments of the present invention relate to a drag-reducing device, and more particularly, the embodiments of the present invention relate to a rigid, laterally wedge-shaped, and fully enclosed device for attaching to and covering an entire blunt nose of a blunt-nosed trailer that is attached to and spaced behind a towing vehicle without impinging upon the towing vehicle so as to reduce drag of the blunt-nosed trailer when being towed by the towing vehicle by changing the blunt nose of the blunt-nosed trailer to a lateral wedge.

B. Description of the Prior Art

Numerous innovations for drag-reducing devices have been provided in the prior art, which will be described below in chronological order to show advancement in the art, and which are incorporated in their entirety herein by reference thereto. Even though these innovations may be suitable for the specific individual purposes to which they address, nevertheless, they differ from the present invention in that they do not teach a rigid, laterally wedge-shaped, and fully enclosed device for attaching to and covering an entire blunt nose of a blunt-nosed trailer that is attached to and spaced behind a towing vehicle without impinging upon the towing vehicle so as to reduce drag of the blunt-nosed trailer when being towed by the towing vehicle by changing the blunt nose of the blunt-nosed trailer to a lateral wedge.

(1) U.S. Pat. No. 4,015,876 to Hulverson et al

U.S. Pat. No. 4,015,876 issued to Hulverson et al. on Apr. 5, 1977 in U.S. class 296 and subclass 184.1 teaches a trailer or semi-trailer body of the wedge type having a horizontal roof and a rearwardly downwardly sloping floor providing a greater height at the rear opening than at the front. The body has the posts and front wall parallel to each other and at right angles to the underframing and lower rail. The roof and rear door frame are disposed at right angles to each other in horizontal and vertical, respectively.

(2) U.S. Pat. No. 4,088,362 to Mollura

U.S. Pat. No. 4,088,362 issued to Mollura on May 9, 1978 in U.S. class 296 and subclass 180.4 teaches a nose cone for attachment to cargo trailers for providing stability and fuel economy. In addition to these properties, the nose cone is inflatable and readily detachable so that it can be used in fleet operation without down time.

(3) U.S. Pat. No. 5,190,342 to Marlowe et al

U.S. Pat. No. 5,190,342 issued to Marlowe et al. on Mar. 2, 1993 in U.S. class 296 and subclass 180.2 teaches a truck tractor-trailer assembly having reduced aerodynamic drag. The skins of the tractor cab and trailer extend longitudinally toward each other and terminate in opposed trailing and leading edges that are as close together as possible while still permitting a full range of yaw and upward pitch about a fifth wheel assembly coupling the trailer to the tractor. In addition to accommodating yaw and upward pitch, the tractor-trailer skin edges are separated by a minimum clearance distance determined by manufacturing tolerances, plus clearances in the fifth wheel assembly, plus elastic deformation of components, and plus the range of maximum roll of the tractor frame. An optimal construction employing concentric spherical surfaces having minimum skin and volume gaps. A method of reducing aerodynamic drag by reducing tractor-trailer skin and volume gaps also is taught.

(4) U.S. Pat. No. 5,280,990 to Rinard

U.S. Pat. No. 5,280,990 issued to Rinard on Jan. 25, 1994 in U.S. class 296 and subclass 180.1 teaches vehicle mountable subsystems that include a modified nose cone, deflecting air between the trailer and its tractor. Drag at the rear is reduced by vertical vanes at its rear corners, mounted by spring biased supports to allow opening rear doors and restoring the deflecting positions upon closing. Air from the top is deflected downwardly across the rear through a transverse upper scoop. A transverse lower scoop directs air from under the trailer upwardly across its rear surface. Both scoops are fabricated from a resilient material to allow compression against a loading dock structure. An undercarriage enclosure, fabricated into a number of longitudinal segments determined by trailer length, having side skirts and a trailer width upper panel, includes an air deflecting front surface and a channeled rear transverse surface. Flexible skirt extension panels depend toward the roadway.

(5) U.S. Pat. No. 5,641,192 to Smith et al

U.S. Pat. No. 5,641,192 issued to Smith et al. on Jun. 24, 1997 in U.S. class 296 and subclass 100.06 teaches an aerodynamic, lightweight, and flexible material top for enclosing a flatbed of a wheeled vehicle having a front and rear. The top includes a series of inverted U-shaped supports extending upwardly from and across the flatbed, with a first support at the front and a last support at the rear. A flexible material is stretched over the supports, and includes a fixed sleeve and a laterally adjustable sleeve that are secured about the first and last supports. At least a portion of the top is pivotally connected as to swing upwardly away from the flatbed to gain access under the top and to the flatbed.

(6) U.S. Pat. No. 7,104,591 to Sanns

U.S. Pat. No. 7,104,591 issued to Sanns on Sep. 12, 2006 in U.S. class 296 and subclass 180.1 teaches a windbreaker air drag reduction system for trailers and other box-like towed vehicles having a blunt-nosed forward face. The system includes a wedge-shaped fairing element including a pair of upstanding panel members adjoining one another and being secured to an upstanding riser. The panel members and riser are attached to a crossbar member that is securely clamped to the trailer tongue support beams. The panel members are secured to the upper and lower face of the forward face of the trailer at their respective outward edges. The combined components of the fairing element cooperate to form a triangular arrangement, with the apex of the triangle being located forwardly of the blunt-nosed forward face of the vehicle. The entire system may be attached, detached, and reattached to multiple trailers or towed vehicles.

(7) United States Patent Application Publication Number 2009/0256386 to Wood

United States Patent Application Publication Number 2009/0256386 published to Wood on Oct. 15, 2009 in U.S. class 296 and subclass 180.1 teaches a frame extension device for the reduction of aerodynamic drag and for improved performance of bluff base ground vehicles by increasing the pressure on the base of the vehicle by stabilizing the wake flow. The device is particularly suited for tractor-trailers utilizing a roll-up type rear door in that it does not block any part of the door opening. The device may be of sufficient thickness to support the weight of an unloading device.

(8) U.S. Pat. No. 7,992,666 to Otterstrom

U.S. Pat. No. 7,992,666 issued to Otterstrom on Aug. 9, 2011 in U.S. class 180 and subclass 69.6 teaches a tractor-trailer including a tractor having a lower tractor duct that receives first air from a front of the tractor and channels the first air through a center area of the tractor and down between a set of rear wheels, a trailer having a lower trailer duct positioned below a cargo space and that channels the first air in the lower trailer duct between each set of trailer rear wheels, and a lower articulation duct positioned near the set of rear wheels in the tractor that receives air from the lower tractor duct and communicates air to the lower trailer duct. An upper duct is provided with an articulation duct that channels air through a ductwork at the top of the trailer and tractor. A louver system at the rear of the trailer enables the air in each duct to be channeled and pulled out of the respective duct in such a manner as to reduce drag and eddy currents using the vacuum at the rear of the trailer.

It is apparent that numerous innovations for drag-reducing devices have been provided in the prior art, which are adapted to be used. Furthermore, even though these innovations may be suitable for the specific individual purposes to which they address, nevertheless, they would not be suitable for the purposes of the embodiments of the present invention as heretofore described, namely, a rigid, laterally wedge-shaped, and fully enclosed device for attaching to and covering an entire blunt nose of a blunt-nosed trailer that is attached to and spaced behind a towing vehicle without impinging upon the towing vehicle so as to reduce drag of the blunt-nosed trailer when being towed by the towing vehicle by changing the blunt nose of the blunt-nosed trailer to a lateral wedge.

2. SUMMARY OF THE INVENTION

Thus, an object of the embodiments of the present invention is to provide a rigid, laterally wedge-shaped, and fully enclosed device for attaching to and covering an entire blunt nose of a blunt-nosed trailer that is attached to and spaced behind a towing vehicle without impinging upon the towing vehicle so as to reduce drag of the blunt-nosed trailer when being towed by the towing vehicle by changing the blunt nose of the blunt-nosed trailer to a lateral wedge, which avoids the disadvantages of the prior art.

Briefly stated, another object of the embodiments of the present invention is to provide a rigid, laterally wedge-shaped, and fully enclosed device for attaching to and covering an entire blunt nose of a blunt-nosed trailer that is attached to and spaced behind a towing vehicle without impinging upon the towing vehicle so as to reduce drag of the blunt-nosed trailer when being towed by the towing vehicle by changing the blunt nose of the blunt-nosed trailer to a lateral wedge. The device includes a frame and a skin. The frame is laterally wedge-shaped, is rigid, and is for attaching to the blunt nose of the blunt-nosed trailer without impinging upon the towing vehicle. The skin is rigid, is laterally wedge-shaped, encloses the frame, and is for covering the entire blunt nose of the blunt-nosed trailer so as to reduce drag of the blunt-nosed trailer when being towed by the towing vehicle by changing the blunt nose of the blunt-nosed trailer to a lateral wedge.

The novel features considered characteristic of the embodiments of the present invention are set forth in the appended claims. The embodiments of the present invention themselves, however, both as to their construction and to their method of operation together with additional objects and advantages thereof will be best understood from the following description of the specific embodiments when read and understood in connection with the accompanying figures of the drawing.

3. BRIEF DESCRIPTION OF THE FIGURES OF THE DRAWING

The figures of the drawing are briefly described as follows:

FIG. 1 is a diagrammatic perspective view of the rigid, laterally wedge-shaped, and fully enclosed device of the embodiments of the present invention attached to and covering an entire blunt nose of a blunt-nosed trailer that is attached to and spaced behind a towing vehicle without impinging upon the towing vehicle so as to reduce drag of the blunt-nosed trailer when being towed by the towing vehicle by changing the blunt nose of the blunt-nosed trailer to a lateral wedge;

4. LIST OF REFERENCE NUMERALS UTILIZED IN THE FIGURES OF THE DRAWING

A. Introductory

Figure 1:
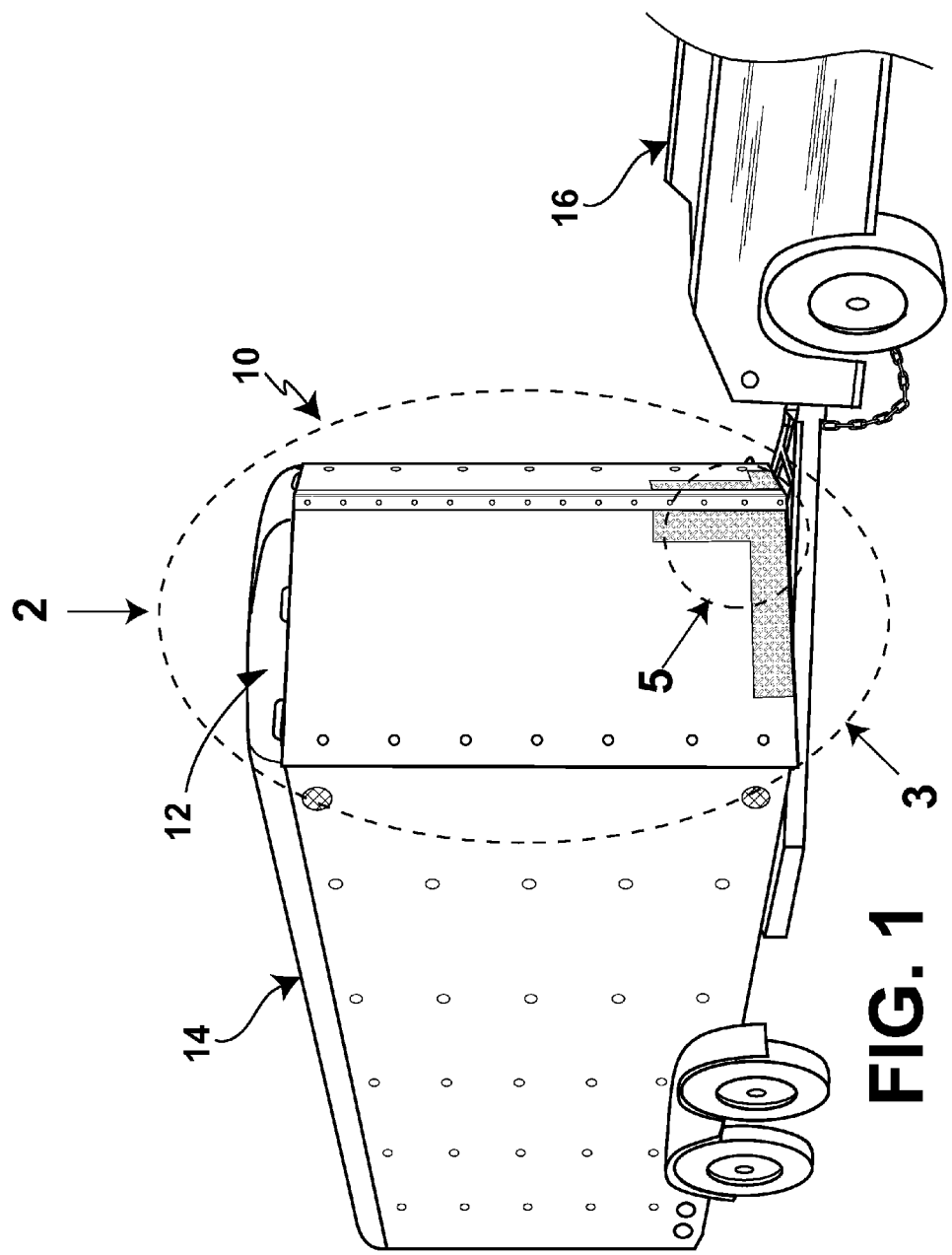
Figure 2:
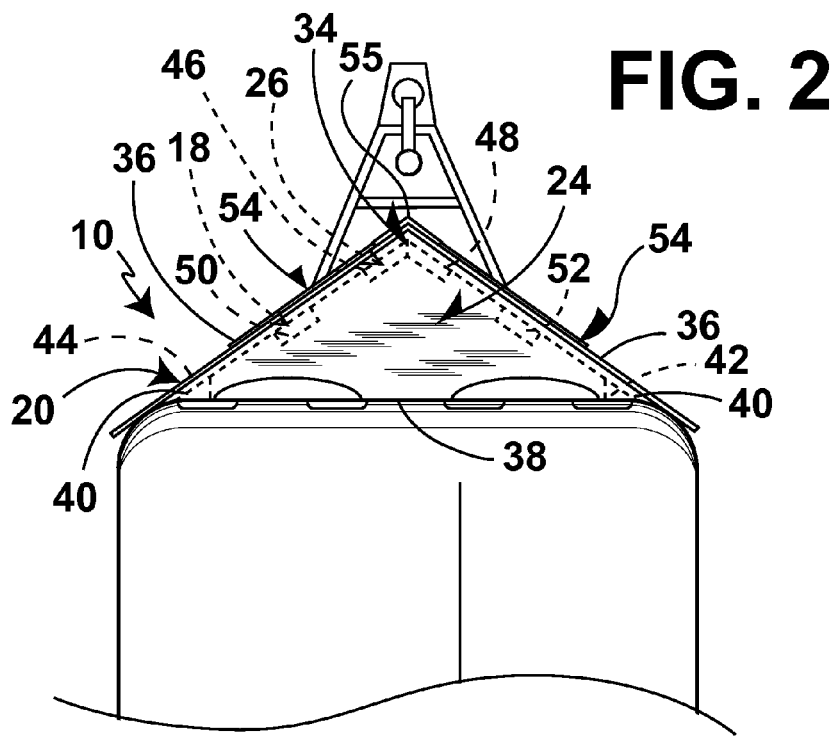
FIG. 2 is an enlarged diagrammatic top plan view taken generally in the direction of ARROW 2 in FIG. 1.
Figure 4:
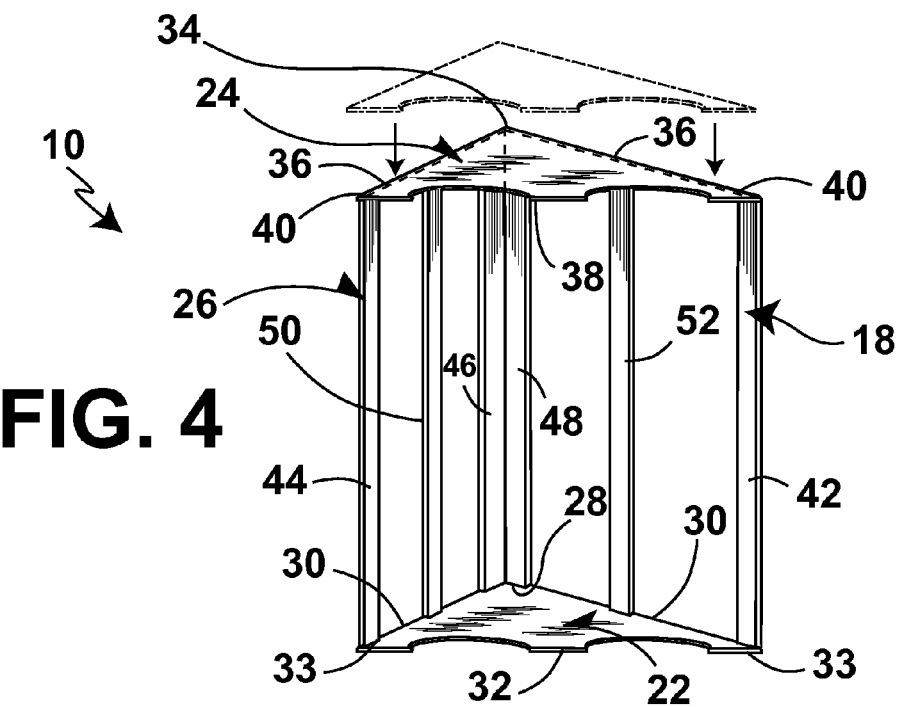
FIG. 4 is a diagrammatic perspective view of the frame of the rigid, laterally wedge-shaped, and fully enclosed device of the embodiments of the present invention identified by ARROW 4 in FIG. 3.

10 rigid, laterally wedge-shaped, and fully enclosed device of embodiments of present invention for attaching to and covering entire blunt nose 12 of blunt-nosed trailer 14 that is attached to and spaced behind towing vehicle 16 without impinging upon towing vehicle 16 so as to reduce drag of blunt-nosed trailer 14 when being towed by towing vehicle 16 by changing blunt nose 12 of blunt-nosed trailer 14 to lateral wedge
12 blunt nose of blunt-nosed trailer 14
14 blunt-nosed trailer
16 towing vehicle

B. Configuration of Rigid, Laterally Wedge-Shaped, and Fully Enclosed Device 10

18 frame for attaching to blunt nose 12 of blunt-nosed trailer 14 without impinging upon towing vehicle 16
20 skin for covering entire blunt nose 12 of blunt-nosed trailer 14 so as to reduce drag of blunt-nosed trailer 14 when being towed by towing vehicle 16 by changing blunt nose 12 of blunt-nosed trailer 14 to lateral wedge

C. Specific Configuration of Frame 18

22 sole plate of frame 18
24 top plate of frame 18
26 studs of frame 18
28 apex corner of sole plate 22 of frame 18
30 pair of sides of sole plate 22 of frame 18
32 base of sole plate 22 of frame 18
33 pair of base corners of sole plate 22 of frame 18
34 apex corner of top plate 24 of frame 18

36 pair of sides of top plate 24 of frame 18
38 base of top plate 24 of frame 18
40 pair of base corners of top plate 24 of frame 18
42 first stud of studs 26 of frame 18
44 second stud of studs 26 of frame 18
46/48 adjacent third stud and fourth stud of studs 26 of frame 18
50 fifth stud of studs 26 of frame 18
52 sixth stud of studs 26 of frame 18

D. Specific Configuration of Skin 20

54 pair of panels of skin 20
55 V-shaped forwardmost junction of pair of panels 54 of skin 20
56 pair of layers of each panel of pair of panels 54 of skin 20
58 inner layer of pair of layers 56 of each panel of pair of panels 54 of skin 20
60 outer layer of pair of layers 56 of each panel of pair of panels 54 of skin 20
62 pair of diamond plates of skin 20
64 V-shaped molding of skin 20
66 screws of skin 20

5. DETAILED DESCRIPTION OF THE PREFERRED EMBODIMENTS

A. Introductory

Referring now to the figures, in which like numerals indicate like parts, and particularly to FIG. 1, which is a diagrammatic perspective view of the rigid, laterally wedge-shaped, and fully enclosed device of the embodiments of the present invention attached to and covering an entire blunt nose of a blunt-nosed trailer that is attached to and spaced behind a towing vehicle without impinging upon the towing vehicle so as to reduce drag of the blunt-nosed trailer when being towed by the towing vehicle by changing the blunt nose of the blunt-nosed trailer to a lateral wedge, the rigid, laterally wedge-shaped, and fully enclosed device of the embodiments of the present invention is shown generally at 10 for attaching to and covering an entire blunt nose 12 of a blunt-nosed trailer 14 that is attached to and spaced behind a towing vehicle 16 without impinging upon the towing vehicle 16 so as to reduce drag of the blunt-nosed trailer 14 when being towed by the towing vehicle 16 by changing the blunt nose 12 of the blunt-nosed trailer 14 to a lateral wedge.

B. Configuration of the Rigid, Laterally Wedge-Shaped, and Fully Enclosed Device 10

Figure 3:
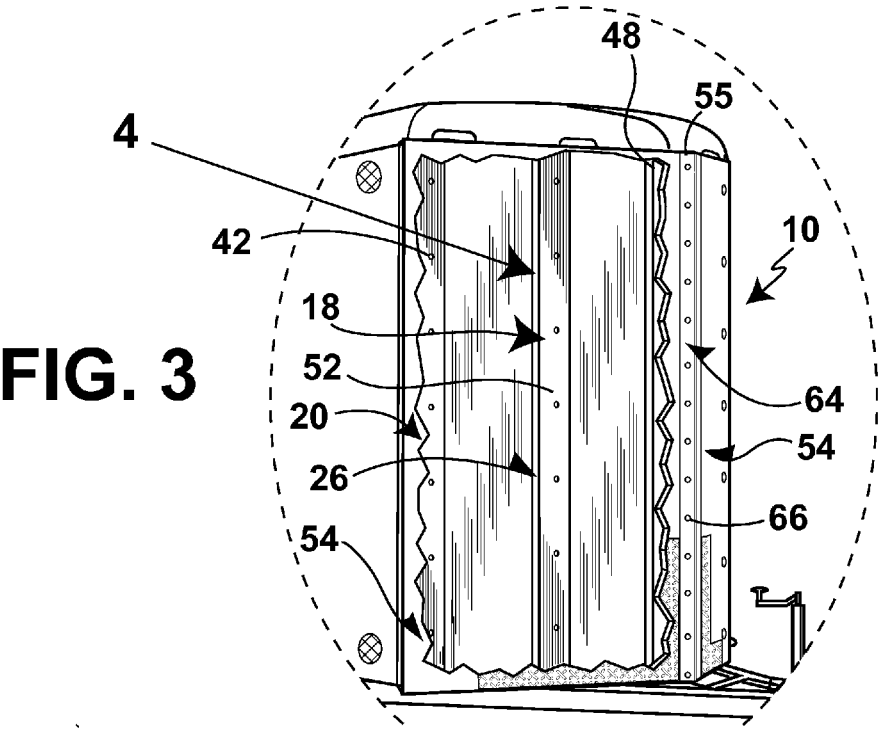
FIG. 3 is an enlarged diagrammatic perspective view with parts broken away of the area enclosed by the dotted curve identified by ARROW 3 in FIG. 1.
Figure 5:
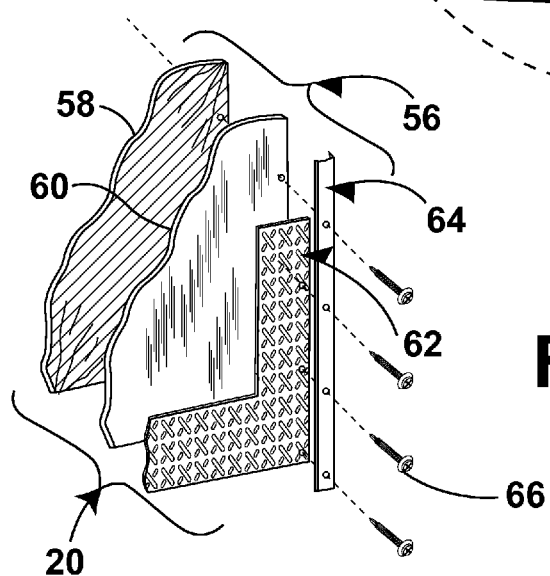
FIG. 5 is an enlarged and exploded diagrammatic perspective view of the area enclosed by the dotted circle identified by ARROW 5 in FIG. 1.

The configuration of the rigid, laterally wedge-shaped, and fully enclosed device 10 can best be seen in FIGS. 2-5, which are, respectively, an enlarged diagrammatic top plan view taken generally in the direction of ARROW 2 in FIG. 1, an enlarged diagrammatic perspective view with parts broken away of the area enclosed by the dotted curve identified by ARROW 3 in FIG. 1, a diagrammatic perspective view of the frame of the rigid, laterally wedge-shaped, and fully enclosed device of the embodiments of the present invention identified by ARROW 4 in FIG. 3, and an enlarged and exploded diagrammatic perspective view of the area enclosed by the dotted circle identified by ARROW 5 in FIG. 1, and as such, will be discussed with reference thereto.

The rigid, laterally wedge-shaped, and fully enclosed device 10 comprises a frame 18 and a skin 20. The frame 18 is laterally wedge-shaped, rigid, and is for attaching to the blunt nose 12 of the blunt-nosed trailer 14 without impinging upon the towing vehicle 16. The skin 20 is rigid, laterally wedge-shaped, encloses the frame 18, and is for covering the entire blunt nose 12 of the blunt-nosed trailer 14 so as to reduce drag of the blunt-nosed trailer 14 when being towed by the towing vehicle 16 by changing the blunt nose 12 of the blunt-nosed trailer 14 to a lateral wedge.

C. Specific Configuration of the Frame 18

The frame 18 comprises a sole plate 22, a top plate 24, and studs 26.

The sole plate 22 of the frame 18 is flat, horizontally oriented, and triangular-shaped, and as such, has an apex corner 28, a pair of sides 30, a base 32, and a pair of base corners 33.

The top plate 24 of the frame 18 is flat, horizontally oriented, and triangular-shaped, and as such, has an apex corner 34, a pair of sides 36, a base 38, and a pair of base corners 40.

The studs 26 of the frame 18 are straight, vertically oriented, and connect the top plate 24 of the frame 18 to the sole plate 22 of the frame 18, with the sole plate 22 of the frame 18 and the top plate 24 of the frame 18 being identically oriented, identically configured, and parallel to each other.

The studs 26 of the frame 18 comprise a first stud 42.

The first stud 42 of the studs 26 of the frame 18 extends vertically from one base corner 33 of the sole plate 22 of the frame 18 to a corresponding base corner 40 of the top plate 24 of the frame 18.

The studs 26 of the frame 18 further comprise a second stud 44.

The second stud 44 of the studs 26 of the frame 18 extends vertically from the other base corner 33 of the sole plate 22 of the frame 18 to the other corresponding base corner 40 of the top plate 24 of the frame 18.

The studs 26 of the frame 18 further comprise an adjacent third stud 46 and fourth stud 48.

The adjacent third stud 46 and fourth stud 48 of the studs 26 of the frame 18 extend vertically from the apex corner 28 of the sole plate 22 of the frame 18 to the apex corner 34 of the top plate 24 of the frame 18.

The studs 26 of the frame 18 further comprise a fifth stud 50.

The fifth stud 50 of the studs 26 of the frame 18 extends vertically from the sole plate 22 of the frame 18 to the top plate 24 of the frame 18, midway between the second stud 44 of the studs 26 of the frame 18 and the adjacent third stud 46 and fourth stud 48 of the studs 26 of the frame 18.

The studs 26 of the frame 18 further comprise a sixth stud 52.

The sixth stud 52 of the studs 26 of the frame 18 extends vertically from the sole plate 22 of the frame 18 to the top plate 24 of the frame 18, midway between the first stud 42 of the studs 26 of the frame 18 and the adjacent third stud 46 and fourth stud 48 of the studs 26 of the frame 18.

D. Specific Configuration of the Skin 20

The skin 20 comprises a pair of panels 54.

The pair of panels 54 of the skin 20 extend vertically from the sole plate 22 of the frame 18 to the top plate 24 of the frame 18, and meet each other at a V-shaped forwardmost junction 55.

One panel 54 of the skin 20 extends horizontally from the first stud 42 of the studs 26 of the frame 18 to the adjacent third stud 46 and fourth stud 48 of the studs 26 of the frame 18.

The other panel 54 of the skin 20 extends horizontally from the second stud 44 of the studs 26 of the frame 18 to the adjacent third stud 46 and fourth stud 48 of the studs 26 of the frame 18.

Each panel 54 of the skin 20 comprises a pair of layers 56.

The pair of layers 56 of each panel 54 of the skin 20 comprise an inner layer 58 and an outer layer 60.

The outer layer 60 of the pair of layers 56 of each panel 54 of the skin 20 directly overlies the inner layer 58 of the pair of layers 56 of an associated panel 54 of the skin 20.

The inner layer 58 of the pair of layers 56 of each panel 54 of the skin 20 is made from sheet exterior grade plywood for rigidity and strength.

The outer layer 60 of the pair of layers 56 of each panel 54 of the skin 20 is made from sheet washable plastic for waterproofing.

The skin 20 further comprises a pair of diamond plates 62.

The pair of diamond plates 62 of the skin 20 are L-shaped.

The pair of diamond plates 62 of the skin 20 overlie the pair of panels 54 of the skin 20, respectively, and extend upwardly along close proximity to the V-shaped forwardmost junction 55 of the pair of panels 54 of the skin 20, respectively, and outwardly along close proximity to the sole plate 22 of the frame 18.

The skin 20 further comprises a V-shaped molding 64.

The V-shaped molding 64 of the skin 20 extends along and conceals the V-shaped forwardmost junction 55 of the pair of panels 56 of the skin 20, and is made of washable plastic for waterproofing.

The skin 20 further comprises screws 66.

The screws 66 of the skin 20 extend through the V-shaped molding 64 of the skin 20, through the pair of diamond plates 62 of the skin 20, through the pair of panels 54 of the skin 20, and thread into the adjacent third stud 46 and fourth stud 48 of the studs 26 of the frame 18.

E. Impressions

It will be understood that each of the elements described above or two or more together may also find a useful application in other types of constructions differing from the types described above.

While the embodiments of the present invention have been illustrated and described as embodied in a rigid, laterally wedge-shaped, and fully enclosed device for attaching to and covering an entire blunt nose of a blunt-nosed trailer that is attached to and spaced behind a towing vehicle without impinging upon the towing vehicle so as to reduce drag of the blunt-nosed trailer when being towed by the towing vehicle by changing the blunt nose of the blunt-nosed trailer to a lateral wedge, however, they are not limited to the details shown, since it will be understood that various omissions, modifications, substitutions, and changes in the forms and details of the embodiments of the present invention illustrated and their operation can be made by those skilled in the art without departing in any way from the spirit of the embodiments of the present invention.

Without further analysis, the foregoing will so fully reveal the gist of the embodiments of the present invention that others can by applying current knowledge readily adapt them for various applications without omitting features that from the standpoint of prior art fairly constitute characteristics of the generic or specific aspects of the embodiments of the present invention.

The invention claimed is:

1. A rigid, laterally wedge-shaped, and fully enclosed device for attaching to and covering an entire blunt nose of a blunt-nosed trailer that is attached to and spaced behind a towing vehicle without impinging upon the towing vehicle so as to reduce drag of the blunt-nosed trailer when being towed by the towing vehicle by changing the blunt nose of the blunt-nosed trailer to a lateral wedge, comprising:
   a) a frame; and
   b) a skin;
   wherein said frame is laterally wedge-shaped;
   wherein said frame is rigid;
   wherein said frame is attached to the blunt nose of the blunt-nosed trailer without impinging upon the towing vehicle;
   wherein said skin is rigid;
   wherein said skin is laterally wedge-shaped;
   wherein said skin encloses said frame;
   wherein said skin covers the entire blunt nose of the blunt-nosed trailer so as to reduce drag of the blunt-nosed trailer when being towed by the towing vehicle;
   wherein said frame comprises:
   c) a sole plate;
   d) a top plate; and
   e) studs;
   wherein said sole plate of said frame is flat;
   wherein said sole plate of said frame is horizontally oriented;
   wherein said sole plate of said frame is triangular-shaped, and as such, has:
   f) an apex corner;
   g) a pair of sides;
   h) a base; and
   i) a pair of base corners;
   wherein said top plate of said frame is flat;
   wherein said top plate of said frame is horizontally oriented;
   wherein said top plate of said frame is triangular-shaped, and as such, has:
   j) an apex corner;
   k) a pair of sides;
   l) a base; and
   m) a pair of base corners;
   wherein said studs of said frame comprise a first stud;
   wherein said first stud of said studs of said frame extends vertically from one base corner of said sole plate of said frame to a corresponding base corner of said top plate of said frame;
   wherein said studs of said frame comprise a second stud; and
   wherein said stud of said frame comprise an adjacent third stud and fourth stud.

2. The device of claim 1, wherein said studs of said frame are straight;
   wherein said studs of said frame are vertically oriented; and
   wherein said studs of said frame connect said top plate of said frame to said sole plate of said frame, with said sole plate of said frame and said top plate of said frame being:
   a) identically oriented;
   b) identically configured; and
   c) parallel to each other.

3. The device of claim 1, wherein said second stud of said studs of said frame extends vertically from said pair of base corners of said sole plate of said frame to the corresponding base corners of said top plate of said frame.

4. The device of claim 1, wherein said adjacent third stud and fourth stud of said studs of said frame extend vertically from said apex corner of said sole plate of said frame to said apex corner of said top plate of said frame.

5. The device of claim 1, wherein said studs of said frame comprise a fifth stud.

6. The device of claim 5, wherein said fifth stud of said studs of said frame extends vertically from said sole plate of said frame to said top plate of said frame; and wherein said fifth stud of said studs of said frame is disposed midway between said second stud of said studs of said frame and said adjacent third stud and fourth stud of said studs of said frame.

7. The device of claim 1, wherein said studs of said frame comprise a sixth stud.

8. The device of claim 7, wherein said sixth stud of said studs of said frame extends vertically from said sole plate of said frame to said top plate of said frame; and wherein said sixth stud of said studs of said frame is disposed midway between said first stud of said studs of said frame and said adjacent third stud and fourth stud of said studs of said frame.

9. The device of claim 1, wherein said skin comprises a pair of panels.

10. The device of claim 9, wherein said pair of panels of said skin extend vertically from said sole plate of said frame to said top plate of said frame; and wherein said pair of panels of said skin meet each other at a V-shaped forwardmost junction.

11. The device of claim 9, wherein one panel of said skin extends horizontally from said first stud of said studs of said frame to said adjacent third stud and fourth stud of said studs of said frame.

12. The device of claim 9, wherein each panel of said skin comprises a pair of layers.

13. The device of claim 12, wherein said pair of layers of each panel of said skin comprise:
a) an inner layer; and
b) an outer layer.

14. The device of claim 13, wherein said inner layer of said pair of layers of each panel of said skin is sheet exterior grade plywood for rigidity and strength.

15. The device of claim 13, wherein said outer layer of said pair of layers of each panel of said skin is sheet washable plastic for waterproofing.

16. The device of claim 10, wherein said skin comprises a pair of diamond plates.

17. The device of claim 16, wherein said pair of diamond plates of said skin are L-shaped.

18. The device of claim 16, wherein said pair of diamond plates of said skin overlie said pair of panels of said skin, respectively; and wherein said pair of diamond plates of said skin extend upwardly along close proximity to said V-shaped forwardmost junction of said pair of panels of said skin, respectively, and outwardly along close proximity to said sole plate of said frame.

19. The device of claim 16, wherein said skin comprises a V-shaped molding.

20. The device of claim 19, wherein said V-shaped molding of said skin extends along said V-shaped forwardmost junction of said pair of panels of said skin; and wherein said V-shaped molding of said skin conceals said V-shaped forwardmost junction of said pair of panels of said skin.

21. The device of claim 19, wherein said V-shaped molding of said skin is washable plastic for waterproofing.

22. The device of claim 19, wherein said skin comprises screws.

23. The device of claim 22, wherein said screws of said skin extend through said V-shaped molding of said skin, through said pair of diamond plates of said skin, through said pair of panels of said skin, and thread into said adjacent third stud and fourth stud of said studs of said frame.

* * * * *